Feb. 27, 1934.  C. F. ABBOTT ET AL  1,948,779
ADSORPTION SYSTEM
Filed June 30, 1931  2 Sheets-Sheet 1
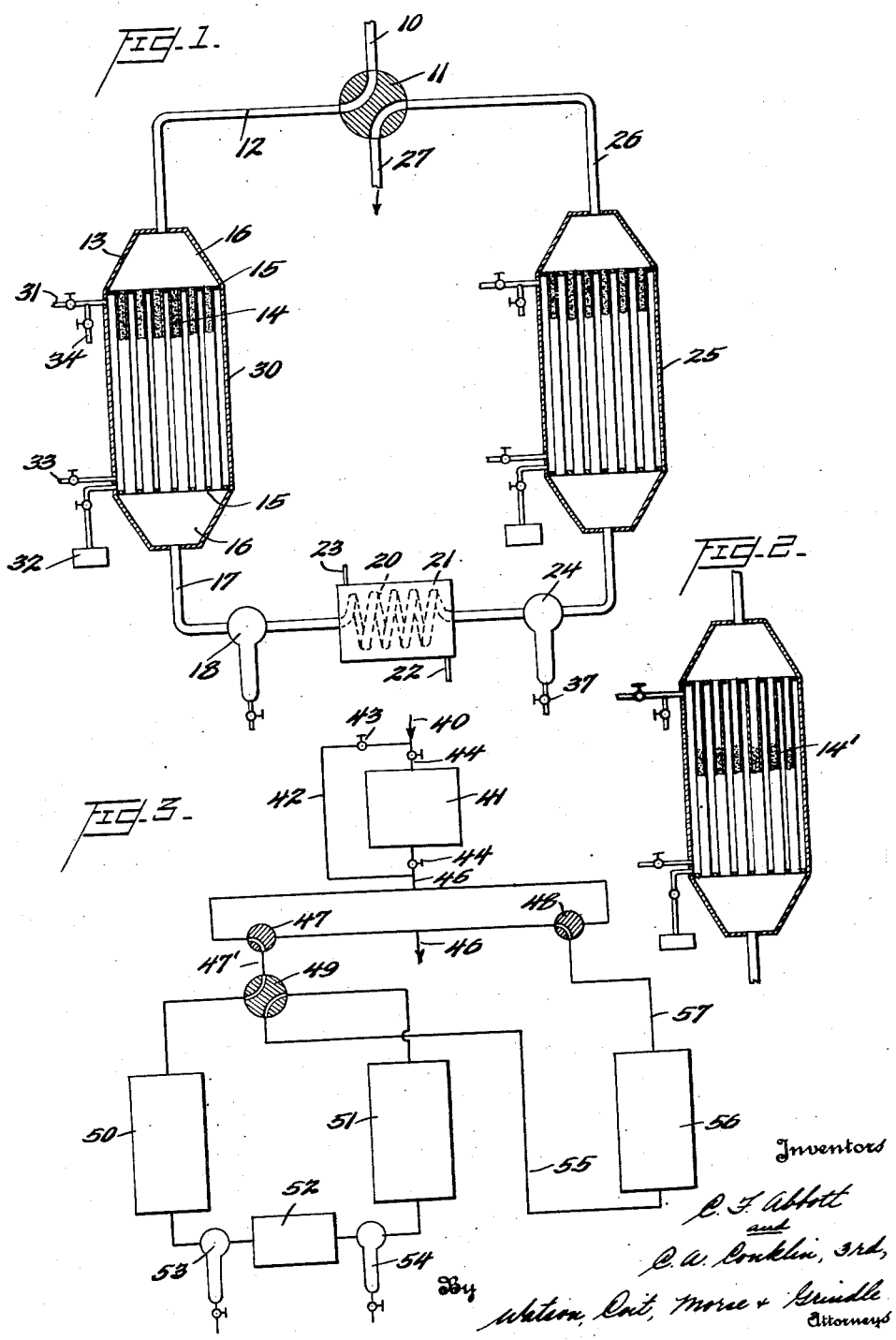

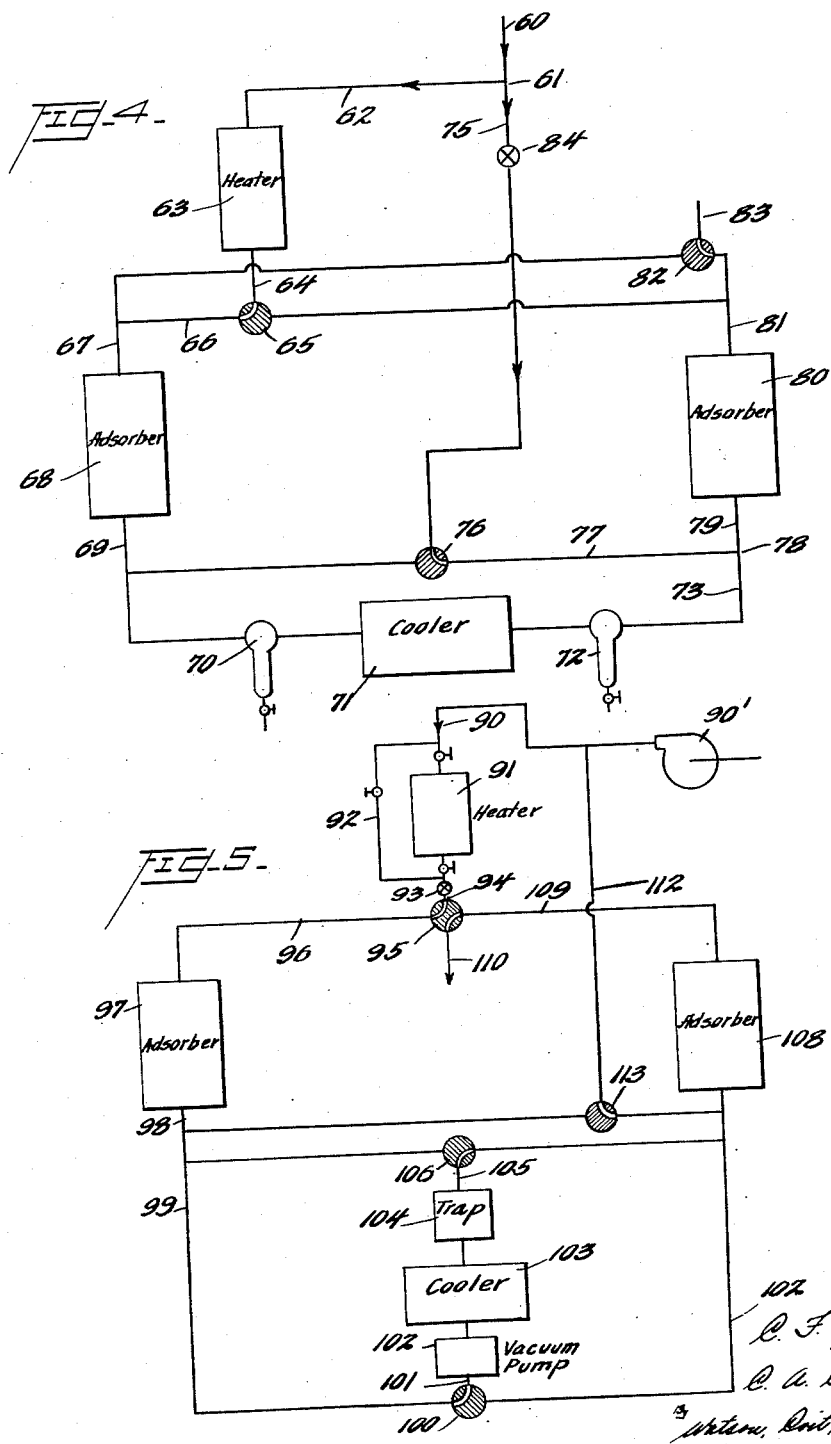

Patented Feb. 27, 1934

1,948,779

UNITED STATES PATENT OFFICE 1,948,779

ADSORPTION SYSTEM

Cornelius Frederick Abbott and Charles A. Conklin, 3d, Baltimore, Md., assignors, by mesne assignments, to Chester F. Hockley, receiver for The Silica Gel Corporation, Baltimore, Md., a corporation of Maryland Application June 30, 1931. Serial No. 548,050

16 Claims. (Cl. 183—4)

This invention relates to systems of and apparatus for removing and/or recovering a condensible from a gaseous mixture, and particularly to such systems wherein there is a series flow of the gaseous mixture from an activating adsorber to an adsorbing adsorber.

It is a general object of the present invention to provide novel and improved systems and apparatus for adsorption of condensible constituents from gaseous mixtures.

An important object of the invention resides in the provision of an adsorption system wherein activation is effected by bringing the gaseous mixture to be treated into contact with a partially saturated adsorbent and conditioning this gas so that it will remove previously adsorbed condensible from the adsorbent.

Another object of the invention resides in the provision of a novel type adsorber which provides for heating or cooling the gaseous mixture during adsorption, or prior to and during adsorption.

Another important feature of the invention resides in the provision of a system and apparatus for adsorbing whereby a more constant condition of the effluent gas can be effected, and in which the changes in cycle are not evident in the discharged gas.

Another object of the invention resides in the provision of a system of, and means for, equalizing the length of the activating and adsorbing phases to prevent excessive activation and wasting of heat.

A further object of the invention resides in the provision of a system and apparatus for removing and/or recovering a condensible from a gaseous vapor wherein activation is effected by reduction of pressure of the mixture in contact with the partially saturated adsorbent.

Other and further objects of the invention and novel features will be apparent to those skilled in the art upon consideration of the accompanying drawings and following specification, wherein are disclosed several exemplary embodiments of the invention, with the understanding, however, that such modifications, changes, and combinations may be made therein as fall within the scope of the appended claims without departing from the spirit of the invention.

In said drawings:

Figure 1 is a diagrammatic illustration of apparatus for carrying out the invention in one of its forms;

Figure 2 is a view of a modified form of adsorber for use with the apparatus of Fig. 1, or with other types of apparatus;

Figure 3 is a schematic representation of apparatus for carrying out a different adsorption system;

Figure 4 is a schematic representation of apparatus for carrying out a still different system of adsorption; and Figure 5 is a schematic representation of apparatus for the recovery of a condensible by the reduction of pressure in the adsorber.

In a great many industrial processes it is highly important that economical separation and/or recovery of condensibles be made from mixtures of gases, gases and vapors, or vapors. As examples of the many uses of such processes may be mentioned the dehydration of atmospheric air, the dehydration of compressed air to prevent freezing and for other purposes, the dehydration of gases, and particularly those which are to be liquefied or solidified, and the recovery of volatile solvents from various commercial processes.

The present inventions are applicable to these and other processes, but for the sake of convenience, the description will to a large extent be explained in connection with the dehydration of compressed air. The advantages of dehydrated, compressed air need not be explained here, since they are believed to be obvious. It is not intended that the invention be at all limited to the particular disclosures, but it is intended to be broadly used for the removing and/or recovery of a "condensible" constituent from a mixture of gases, gases and vapors, or vapors. The word "condensible" is used to designate broadly any constituent of a gaseous mixture which will condense at higher temperatures than the remaining constituents under the respective partial pressures existing at the system inlet and which can be removed by adsorption and condensed by cooling.

The preferred material for use in abstracting moisture from air and from other gases, and for most of the other purposes, is an adsorbent of the type which can be activated for re-use as by heating, pressure reduction or displacement by other substances. Such activation is explained by the disturbance of vapor pressure equilibrium within and without the pores of the adsorbent. As an example of such adsorbents may be mentioned the highly porous gels, of which silica gel is probably the best known and most widely used. This material is available in granular form and can conveniently be used in beds through which the gases to be treated can be passed at any desired velocity and pressure.

The customary manner of using such adsorbents is to permit one adsorber to become substantially saturated with the removed condensible and to then remove this adsorber from the circuit and replace it by a fresh or activated adsorber, and then treating the saturated adsorbent to remove the condensible which can be recovered if it has value, by a simple condensation process. In accordance with the present invention, however, activation is effected by giving up the condensible in vapor form to the gaseous mixture which is to be treated, thus enriching it, then cooling the mixture below its dewpoint, removing the condensate resulting, and then passing the cooled mixture through an active adsorbent for the removal of the remaining condensible, and periodically reversing the positions of the adsorbents in the series circuits.

In accordance with Fig. 1 of the drawings, the gaseous mixture to be treated is delivered through the inlet pipe 10 to the two-way, four-port valve 11, which in the drawings is shown as set to deliver this gas through the pipe 12 to the adsorber 13, where it is brought into contact with the adsorbent 14 arranged in a plurality of tubes opening through headers 15 into the compartments 16 at the ends of the adsorber casing. The outlet from the adsorber 13 is through the pipe 17 into the condensate trap 18 of conventional construction, and then through the cooling coil 20 immersed in the tank or jacket 21 through which cool water may be introduced from the pipe 22 and wasted from the pipe 23. From the cooler 20, the gas passes to a second condensate trap 24 and thence to the adsorber 25, the outlet of which is through the pipe 26, and the second passage through the valve 11 to the discharge pipe 27. A reversal of the valve 11 reverses the direction of flow, and in effect exchanges the positions of the adsorbers in the circuit.

Each of the adsorbers 13 and 25 is provided with a jacket 30 surrounding the adsorbent-filled tubes, and into which steam or other heating media may be introduced through the pipe 31 and condensed therein in giving up its heat, and the condensate withdrawn through a suitable trap 32. For cooling the adsorbent, cold water may be introduced through pipe 33 and wasted through pipe 34.

In the operation of the system, the air to be hydrated is introduced through the pipe 10 and delivered to one of the adsorbers by the proper setting of the valve 11, and on contacting with the adsorbent, which is assumed to be at least partially saturated from a previous cycle, serves to activate this adsorbent. In order that this may take place, the temperature of the entering air must be higher than that of the adsorbent or heat must be supplied in some other manner. It is conceivable that the gas introduced into the adsorber may be heated from some previous operation, as for instance, the compressing of the air, in which case activation can readily be effected. It can be materially augmented, however, by the introduction of steam or other heating media into the jacket 30, which serves not only to heat the adsorbent but also the gas flowing through it.

Whatever process is used for causing the activation of the adsorbent in the adsorber 15, the final result is to increase the actual humidity of the air issuing therefrom, but since the air is not super-saturated, it will pass through the trap 18 without being affected thereby. However, on being cooled in the cooling coil 20, the air, which is practically at saturation and at a fairly high temperature, will be cooled to a temperature below its dewpoint, and the excess moisture will be given up in the form of fog which will be separated out in the trap or separator 24, and can be drawn off either automatically or manually through the drain 37.

The cooled gas thus released of its excess burden of water vapor and probably having a less actual humidity than when entering at 10, is then passed into the adsorber 25 containing active adsorbent, which in accordance with its mode of operation, will remove substantially all of the remaining water vapor from the air, delivering it into the pipe 26 and finally to the discharge 27 in a substantially dry condition. In order that the air may be delivered at a low temperature and also to increase the capacity of the adsorbent for taking up moisture, cooling of the adsorbent and of the air may be effected by passing cold water into the jacket of the adsorber 25 which is constructed identical with the adsorber 15.

After the adsorbent in adsorber 25 reaches that degree of saturation above which it is uneconomical to carry it, the valve 11 is reversed, and the adsorber 25 is placed on the activation phase, and the now activated adsorber 15 is placed on the adsorption phase, and under these conditions the trap 24 becomes inactive and the trap 18 removes the condensed water vapor.

Under some circumstances, the entering gaseous mixture may be insufficiently heated prior to entering the system, and to cope with this situation, the adsorbers may be constructed as shown in Fig. 2. Here the actual mechanical construction is identical with that shown in Fig. 1, but the adsorbent material 14' fills only a portion of each tube. This then causes the upper and empty ends of the tubes to function as heaters for the incoming gaseous mixture, as they are exposed on their outer surfaces to the steam in the jacket and have their inner surfaces in contact with the entering gases. In this manner, the gases can be heated up to activating temperature before they are brought into contact with the adsorbent, and since activation is an endothermic process, heat is also supplied to the adsorbent from the steam in the jacket.

When such an adsorber is on the adsorption phase and with the direction of flow upward, it need be filled with cold water only to the level of the top of the adsorbent therein, if it is only desired to remove the heat of adsorption to improve the efficiency of the adsorbent, but by filling it with water to the top the empty portions of the adsorbent tubes become in effect, an after cooler which may serve to lower the temperature of the effluent air to a certain desired temperature.

It will be obvious that the construction of the adsorbers can readily be varied within the scope of this invention, such for instance, as by placing adsorbent in the jacket and permitting the heating or cooling fluid to flow through the tubes or by some other obvious expedient.

Fig. 3 illustrates diagrammatically apparatus for carrying out the invention wherein it is necessary or desirable to have a uniformly dry product, for instance, air. When using two adsorbers, in accordance with the system of Fig. 1, there is a characteristic peak in the curve representing the absolute humidity of the effluent air, owing to the sudden decrease in effectiveness of the active adsorbent as it approaches the break point of effective saturation, and it is difficult to exactly judge the time to shift the cycle. The apparatus of Fig. 3 overcomes this defect by providing a third adsorber which acts as a second adsorption stage to remove the vapors which escape the first active adsorber. The device does not function as an ordinary two-stage adsorption plant, however, in that the third adsorber remains in the second stage position for a number of cycles of change of the first two adsorbers and is only occasionally activated itself, say once in every ten or twenty cycles of change of the first two adsorbers.

In the arrangement of Fig. 3, the gas to be treated enters through the inlet pipe 40 in which is interposed a suitable heater 41 which may comprise a coil arranged in a jacket equipped to receive steam or other heating fluid. Such a heater is only necessary if jacketed adsorbers in accordance with Fig. 1 are not used, and in case the entering gases are normally of such low temperature as to be ineffective to activate the first adsorber in the series. This heater may be bypassed by a pipe 42 which can be made to function by opening the valve 43 and closing the valves 44.

The outlet pipe 45 from the heater enters a pipe loop having at its opposite side a discharge pipe 46 for the effluent stripped gas and having between this pipe and the inlet pipe 45 and on each side of the loop a three-port, two-way valve 47 and 48 respectively. The connection from the valve 47 is by way of the pipe 47' to a system identical with that of Fig. 1, insofar as the arrangement of the parts is concerned. There is the distributing valve 49, the two absorbers 50 and 51, the cooler 52, and the two traps 53 and 54.

In the position of the valve 49 as shown, the adsorber 50 is activating and the adsorber 51 adsorbing, and a reversal of this valve reverses the effective position of the adsorbers in the circuit. The discharge pipe 55 from the valve 49 is equivalent to the discharge pipe 27 in Fig. 1, and from it flows the substantially dry air or gas, but to ensure that this gas be uniformly dried, it is passed into the third adsorber 56 which may be of substantially the same capacity as the adsorbers 50 and 51, or smaller. Owing to the fact that it treats only a gas which is already substantially dried, it will be effective over a number of cycles of the adsorbers 50 and 51.

As the system is shown in the figure, the valve 47 is set to deliver the gas from the inlet pipe 40 to the valve 49, and the valve 48 is set to deliver gas from the discharge pipe 57 of the adsorber 56 into the lower side of the loop and out through the effluent gas pipe 46. Normally, the valve 49 is reversed periodically to activate the adsorbers 50 and 51, but after a number of such cycles it becomes desirable to activate the adsorber 56, so after adsorber 51 has been activated, the valves 47 and 48 are shifted so that the entering hot gases flow to the right in the upper side of the loop through the valve 48, pipe 57, third adsorber 56, pipe 55, valve 49, adsorber 50, which is now also substantially saturated since 51 has just been activated, then to the cooler and trap 54 which removes the condensed vapor, and finally through the adsorber 51 which is freshly activated, then through the valve 49 to the valve 47, the lower part of the loop, and out through the discharge pipe 46. As soon as the adsorber 56 is activated, it is placed at the end of the circuit by a proper operation of the valves, as will be evident.

In Fig. 4 there is shown a further modification in which it is possible to regulate the activating and adsorbing phases so that they become of substantially identical length. In the ordinary series flow system, as shown in Fig. 1, either using a heater for the entering gases or the jacketed adsorbers, it is found that if all the gas passes through the first adsorber at such a temperature as to be effective in activating it, then this adsorber becomes completely activated a considerable time before the second adsorber in the series reaches the feasible saturation point. This naturally results either in a waste of heat for activating the first adsorber or in a requirement for some form of control for shutting off the heat when activation is complete. To eliminate this difficulty, the arrangement of Fig. 4 has been devised.

In general, this arrangement is somewhat similar to Fig. 1. The entering gases are introduced into the system through the pipe 60 and at 61 divide, a portion flowing through the pipe 62 to the heater 63, wherein they are heated and passed through the pipe 64, two-way, three-port valve 65, pipes 66 and 67 to adsorber 68 for activating the same. From this adsorber they pass through the pipe 69, idle trap 70, cooler 71, functioning trap 72, and pipe 73.

Another portion of the gases from the pipe 60 follows the branch pipe 75, two-way, three-port valve 76, pipe 77, to the junction 78, where they combine with the portion of the gases from the pipe 73 and together enter the pipe 79 and the second absorber 80 which contains the active adsorbent, and leave this adsorber by the pipe 81, three-port, two-way valve 82, and discharge pipe 83.

In the pipe 75 is the regulating valve 84 which may be so adjusted as to provide the proper ratio of activating gases to gases flowing directly to the second adsorber, so that only sufficient gases are heated and pass through the adsorber 68 to activate it in approximately the time required to actuate the adsorber 80 to an effective degree with the condensate from the combination of the gases used for activating adsorber 80 and that portion flowing directly to the active adsorber through the branch pipe 75.

For reversing the positions of the adsorbers in the circuit, all three of the valves 65, 76 and 82 are reversed, and it will be obvious that the direction of flow will then be so changed as to place adsorber 80 on the activating phase and adsorber 68 on the adsorbing phase, without changing the balance of the circuit insofar as the relative positions of the parts are concerned except that now trap 70 becomes the effective one and trap 72 the idle one.

In Fig. 5 there is disclosed a system which, while suitable for dehydrating compressed air, is mainly intended for the dehydration of various gases or the removal and/or recovery of volatiles therefrom. This system functions by activating by reduction in pressure in the adsorber rather than by heating, but a combination of both may be used if it is found desirable. Where corrosive gases, such as chlorine, are encountered the apparatus of this embodiment or of the others may be made of suitable resistant material.

In the arrangement of Fig. 5, the moisture-laden gas is delivered to the pipe 90 by a blower 90' and may pass through the heater 91, or be bypassed around it through the pipe 92 as described in connection with Fig. 3. The gas then enters the pipe 94 and two-way, four-port valve 95 which, as shown, is set to deliver it to the pipe 96 and the adsorber 97 which is to be activated. From the adsorber the gas passes through the pipes 98, 99 to the two-way, three-port valve 100 which is so set as to deliver it through the inlet pipe 101 to the vacuum pump 102.

The entering gases are throttled at 93 and therefore the vacuum pump maintains a reduced pressure in the adsorber 97, which is assumed to have been previously saturated or partially saturated, and this reduction in pressure serves to release the moisture or other adsorber constituent from the adsorbent therein, since it effects an unbalance in the vapor pressures and the excessive vapor pressure in the pores of the adsorbent causes desorption. A controlled amount of gas always flows through the throttle valve 93 to aid in removing the adsorbed vapors from the adsorber by acting as a sweeping medium. This is insufficient in quantity to materially affect the vacuum.

On leaving the pump 102 the gases enriched by the vapors eliminated from the adsorber 97 are restored to substantially atmospheric pressure and passed into the cooler 103. The combination of raised pressure and cooling condenses a quantity of the vapors from the enriched gaseous mixture and this condensate is removed by the trap 104. From the trap the gases flow through the pipe 105 to the two-way, three-port valve 106, set as shown and then into adsorber 108 to be stripped of the condensible and are then delivered through the pipe 109 and valve 95 to the discharge pipe 110.

In order to maintain a flow of gases greater than that necessary for sweeping out the activating adsorber the pipe line 112 may be embodied, connected between the inlet pipe 90 and the two-way, three-port valve 113, having pipe connections to each adsorber as shown. When the valves are set as in the drawings the auxiliary quantity of gases flow into the active adsorber along with those which have been used for activating and are there stripped of their condensible.

The blower 90' may be replaced by a suction fan at the outlet pipe 110 if desired.

To reverse the positions of the adsorbers in the circuit, all three of the two-way valves 95, 100 and 106 are thrown over so that the direction of gas flow is reversed as will be obvious.

This modification is susceptible to operation either by activating with vacuum alone, with heat alone, or with a combination of heat and vacuum, and together with the modifications of Figs. 3 and 4 is also susceptible to use with jacketed adsorbers of the type shown in either Fig. 1 or Fig. 2 as will be clear, in which case any other heaters can be eliminated.

It will be readily appreciated by those skilled in the art that the various forms of the invention herein disclosed can be modified one in accordance with another without departing from the spirit of the invention as set forth in the following claims.

Having thus described the invention, what is claimed as new and desired to be secured by Letters Patent is:

1. The method of continuously removing a condensible from a gaseous mixture comprising passing the mixture successively into contact with two batches of adsorbent, conditioning the mixture while in contact with one batch to activate one batch and to charge the other with condensible, removing condensible from the mixture in passing between batches, and periodically reversing the positions of the batches in the circuit.

2. The method of continuously removing a condensible from a gaseous mixture comprising passing the mixture into contact with spent adsorbent, simultaneously supplying heat to the adsorbent, cooling the issuing mixture to precipitate a portion of the condensible, removing the condensate, contacting the cooled mixture and active adsorbent, simultaneously removing the heat of adsorption from the adsorbent and delivering the stripped gaseous residue.

3. The method of continuously removing a condensible from a gaseous mixture comprising passing the mixture through a bed of partially saturated adsorbent, supplying heat of activation during the passage, cooling the issuing enriched mixture below the dew point thereof, removing the condensate, passing the cooled mixture through a bed of active adsorbent and delivering the stripped gaseous residue.

4. The method of continuously removing a condensible from a gaseous mixture comprising bringing the mixture and a partially saturated adsorbent into contact, supplying heat during contact to activate the adsorbent, precipitating and removing a portion of the condensible from the enriched mixture, bringing the mixture and active adsorbent into contact to remove the remaining condensible and delivering the stripped residue for use.

5. The method of continuously removing a condensible from a gaseous mixture comprising bringing the mixture and a partially saturated adsorbent into contact, supplying heat prior to and during contact to activate the adsorbent, precipitating and removing a portion of the condensible from the enriched mixture, bringing the mixture and active adsorbent into contact to remove the remaining condensible and delivering the stripped residue for use.

6. Apparatus for removing condensible from a gaseous mixture comprising in combination, an adsorber containing porous adsorbent, means to deliver a gaseous mixture thereto, means to heat the adsorbent and mixture to thereby enrich the mixture and activate the adsorbent, means to cool the mixture leaving the adsorber, means to separate the condensate resulting from said cooling, a second adsorber containing porous adsorbent arranged to receive the mixture after separation and means to deliver stripped gas from said second adsorber.

7. Apparatus for removing condensible from a gaseous mixture comprising in combination, an adsorber containing porous adsorbent, means to deliver a gaseous mixture thereto, means to heat the adsorbent and mixture to thereby enrich the mixture and activate the adsorbent, means to cool the mixture leaving the adsorber, means to separate the condensate resulting from said cooling, a second adsorber containing porous adsorbent arranged to receive the mixture after separation, means to deliver stripped gas from said second adsorber, and means to interchange the positions of the two adsorbers in the circuit.

8. Apparatus for removing condensible from a gaseous mixture comprising in combination, a mixture inlet pipe, a pair of adsorbers, a valve arranged to associate a port of either adsorber with the inlet pipe, a condensate trap connected to a second port of each adsorber, a cooler piped between said traps, a stripped gas delivery pipe, means associated with said valve to connect the first mentioned port of the adsorber not connected to the inlet pipe to the delivery pipe and means to heat the adsorber connected to the inlet pipe.

9. The method of removing condensible from a gaseous mixture comprising heating a portion of the mixture, passing the heated portion into contact with partially saturated adsorbent to activate the same and enrich the mixture, cooling the enriched portion and removing the condensate, combining the cooled portion and the remaining untreated portion of the mixture and passing the same into contact with active adsorbent to remove the condensible and delivering the stripped gas.

10. The method of removing condensible from a gaseous mixture comprising heating a portion of the mixture, passing the heated portion into contact with partially saturated adsorbent to activate the same and enrich the mixture, cooling the enriched portion and removing the condensate, combining the cooled portion and the remaining untreated portion of the mixture and passing the same into contact with active adsorbent to remove the condensible, delivering the stripped gas, and reversing the positions of the adsorbents in the cycle to produce continuous operation.

11. The method of removing condensible from a gaseous mixture comprising heating a portion of the mixture, passing the heated portion into contact with partially saturated adsorbent to activate the same and enrich the mixture, cooling the enriched portion and removing the condensate, combining the cooled portion and the remaining untreated portion of the mixture and passing the same into contact with active adsorbent to remove the condensible, delivering the stripped gas, and regulating the proportions of mixture heated and unheated to activate the first adsorbent in substantially the same time as required to charge the second adsorbent.

12. The method of removing a condensible from a gaseous mixture comprising imparting heat to the mixture and contacting the mixture with partially saturated adsorbent, cooling the enriched mixture on leaving the adsorbent to precipitate a portion of the condensible, removing the condensate, contacting the cooled mixture and active adsorbent, contacting the substantially stripped mixture and a second batch of active adsorbent, periodically reversing the positions of the first two batches of adsorbent in the circuit and occasionally positioning the third batch at the beginning of the circuit to activate it.

13. Apparatus for removing condensible from a gaseous mixture comprising, means to heat the mixture, a pair of adsorbers each having two ports, means to associate a port of either adsorber with the heated mixture, a condensate separator associated with another port of each adsorber, a cooler connecting said separators, a third adsorber, means to associate the remaining port of the adsorber not connected to the heated mixture to the inlet of the third adsorber, a discharge pipe for the stripped gas and means to alternate the positions of the pair of adsorbers in the cycle and means to connect the third adsorber between the heated mixture and the pair of adsorbers and to connect one of the pair to the discharge pipe.

14. The method of removing a condensible from a gaseous mixture comprising contacting the mixture and adsorbent partially saturated with the condensible, under reduced pressure thus enriching the mixture and activating the adsorbent, then cooling the mixture and removing the condensed condensible, then passing the mixture into contact with active adsorbent, delivering the stripped gas and periodically reversing the positions of the adsorbents in the cycle.

15. The method of removing a condensible from a gaseous mixture comprising heating the mixture, contacting the heated mixture under reduced pressure with a batch of partially saturated adsorbent to activate the adsorbent, then bringing the enriched mixture below the dew point and removing the condensate and finally contacting the mixture and a batch of active adsorbent, delivering the stripped gas and periodically exchanging the positions of the batches.

16. The method of continuously removing a condensible from a gaseous mixture comprising passing a limited quantity of the mixture into contact with a batch of partially saturated adsorbent under reduced pressure to sweep out the condensible relieved by the pressure reduction, cooling the thus enriched mixture, removing the condensible liquefied by the cooling, combining the residue and more of the mixture and bringing the combination into contact with a batch of active adsorbent to remove the condensible and periodically reversing the positions of the adsorbent batches in the circuit.

C. FREDERICK ABBOTT.
CHARLES A. CONKLIN, 3RD.